United States Patent [19]

Nor et al.

[11] Patent Number: 5,594,318

[45] Date of Patent: *Jan. 14, 1997

[54] TRACTION BATTERY CHARGING WITH INDUCTIVE COUPLING

[75] Inventors: Jiri K. Nor, Oakville; Josef V. Soltys, Mississauga, both of Canada

[73] Assignee: Norvik Traction Inc., Mississauga, Canada

[*] Notice: The term of this patent shall not extend beyond the expiration date of Pat. No. 5,548,200.

[21] Appl. No.: 419,188

[22] Filed: Apr. 10, 1995

[51] Int. Cl.$^6$ ............................................. H02J 7/04
[52] U.S. Cl. ................................. 320/2; 320/27
[58] Field of Search ................................ 320/2, 27

[56] References Cited

U.S. PATENT DOCUMENTS

| 4,656,412 | 4/1987 | McLyman | 320/39 |
|---|---|---|---|
| 5,157,319 | 10/1992 | Klontz et al. | 320/2 |
| 5,179,335 | 1/1993 | Nor | 320/21 |
| 5,202,617 | 4/1993 | Nor | 320/2 |
| 5,204,611 | 4/1993 | Nor et al. | 320/21 |
| 5,206,578 | 4/1993 | Nor | 320/14 |
| 5,216,402 | 6/1993 | Carosa | 336/66 |
| 5,323,099 | 6/1994 | Bruni et al. | 320/2 |
| 5,327,066 | 7/1994 | Smith | 320/2 |
| 5,341,083 | 8/1994 | Klontz et al. | 320/2 |

FOREIGN PATENT DOCUMENTS

| 3528659A1 | 2/1987 | Germany | H02J 7/00 |
|---|---|---|---|
| 4236286A1 | 5/1994 | Germany | H02J 7/00 |

OTHER PUBLICATIONS

K. W. Klontz, D. M. Divan, D. W. Novotny; "An Actively Cooled 120 KW Coaxial Winding Transformer For Fast Charging Electric Vehicles", 0–7803–1993–1/1994 1994 IEEE; pp. 1049 through 1054.

Primary Examiner—Robert Nappi
Assistant Examiner—Patrick B. Law
Attorney, Agent, or Firm—Donald E. Hewson

[57] ABSTRACT

A method and apparatus for charging the traction battery of an electric vehicle are provided. Charging energy is delivered from a charging station at a predetermined voltage and at a delivery frequency in the range of from 10 kHz up to 200 kHz, The charging energy is transferred to the vehicle through an inductive coupler, having a primary side connected to the charging station and a secondary side mounted within the vehicle. A rectifier is mounted in the vehicle and interposed between the secondary side and the battery. When the vehicle is connected to a charging station, it is interrogated to determine the nature of the charge controller that is on board the vehicle; and logic decisions invoking the particular mode for charging the vehicle are made depending on the nature and type of charge controller that is on board the vehicle. The value of initial charging current is set either by an on board battery charging control module in the vehicle, or by the charge control module which is present in the charging station; or alternatively, by being preset at the charging station. Initial charging current, and the amount of charging energy to be delivered, may be established by insertion of a card into a data interface on the charging station. Under controlled conditions, a plurality of vehicles may be charged at a single establishment having a plurality of charging stations, by distributing energy to any one vehicle according to priority criteria to be established.

18 Claims, 5 Drawing Sheets

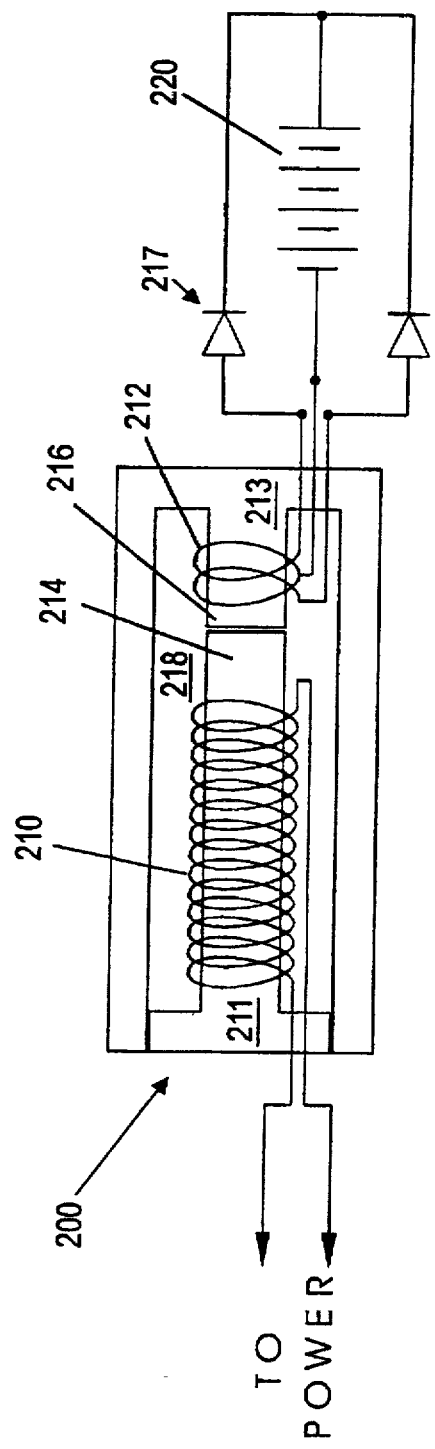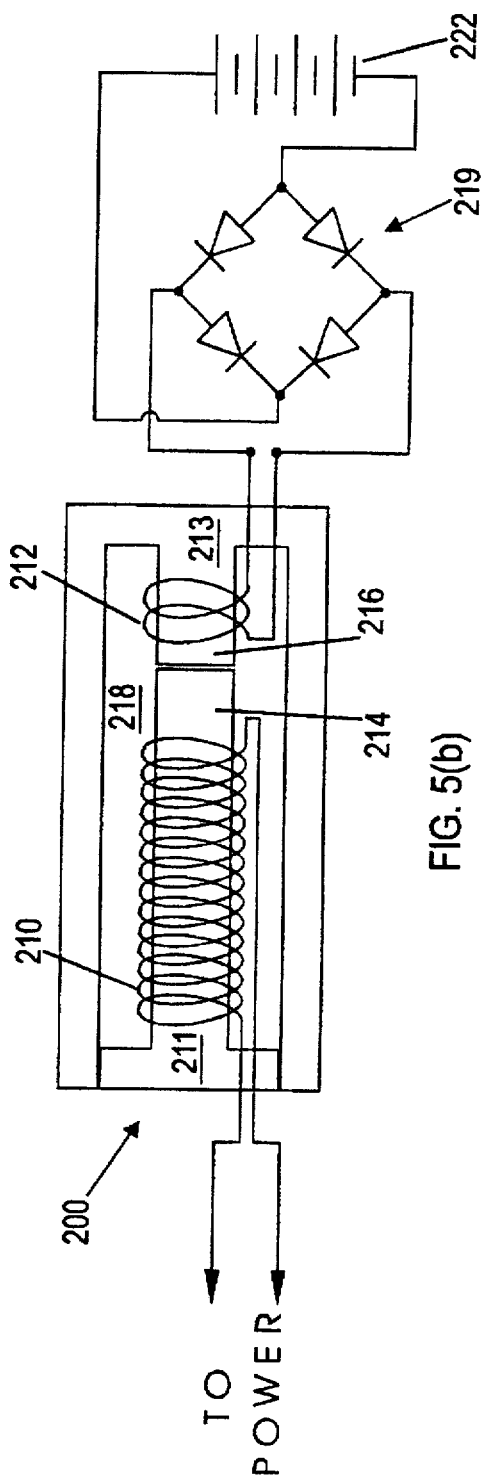
FIG. 5(a)
FIG. 5(b)

TRACTION BATTERY CHARGING WITH INDUCTIVE COUPLING

FIELD OF THE INVENTION

This invention relates to apparatus and methods for providing fast recharging of electric vehicle batteries. In particular, the present invention provides a charging station and a method whereby charging the battery of a vehicle whereby delivery of charging energy to the electric vehicle battery may be accomplished no matter what kind of charge controller may be on board the vehicle. More especially, the present invention provides a charging station and a method whereby charging energy is transferred from the charging station to the electric vehicle as alternating current in the range of from 10 kHz up to 200 kHz, and then rectified in the vehicle. Control of the rate of delivery of charging energy may depend on various criteria depending on the nature and sophistication of a battery charging control module which may be present in the vehicle, or otherwise under the control of a charge control module which is present in the charging station.

BACKGROUND OF THE INVENTION

Fast charging of batteries is now becoming well known. Reference will be made, hereafter, to several patents which are commonly owned herewith, and which teach various aspects of fast battery charging. Electric vehicles are now becoming more popular for a variety of reasons. Indeed, electric vehicles may become mandated to a greater or lesser extent due to the imposition of regulations requiring that at least a certain percentage of vehicles sold by any one manufacturer of vehicles—especially, passenger cars with seating from two to nine passengers, including the driver—and which are conventionally powered by internal combustion engines, must also include a specific number of vehicles that are so-called "zero emission" vehicles. That means that such vehicles have no emissions of noxious gasses, and the most common type of vehicle which would meet such stringent standards is an electric vehicle. Electric vehicles are powered by batteries, and present a number of problems or other difficulties to be overcome.

Not the least among those problems is the fact that in order for an electric vehicle to have any reasonable range—the distance that it can be driven—there has to be significant energy storage by way of batteries on board the vehicle. As the vehicle is driven, it uses energy delivered from the batteries, converting it to driving power delivered to the wheels of the vehicle, and thus there is only a finite distance or period of time over which the vehicle can be operated without requiring that the batteries be recharged.

Other related conditions also arise in respect of fleets of vehicles that are privately or corporately owned, but which may have differing purposes. For example, large manufacturing plants, distribution warehouses, and the like, may have a very considerable number of battery powered fork lift trucks, other traction or towing devices, and so on. Golf courses usually have a large number of golf carts to be rented by golfers playing a round of golf—indeed, some courses require that the players utilize a golf cart. Other such fleets may be localized, such as mail or courier package delivery carts that operate in a localized delivery route, day after day. All of those kinds of electric vehicles are also considered as candidates for becoming clients of charging stations in keeping with the present invention.

In another aspect of the invention, commercially operated "service stations" are contemplated. Thus, as the use of electric vehicles becomes more widespread, and such vehicles are essentially otherwise indistinguishable from ordinary passenger cars travelling on the roads, those cars may be driven further from home, or they may be rental vehicles used by visitors to a particular locale. In any event, there will be a growing requirement for such vehicles simply to pull into a station in much the same sense as an ordinary car would be driven into a service station for refuelling. In the case of an electric vehicle, however, instead of gasoline being placed into the fuel tank of the car, electrical energy is transferred into the batteries of the vehicle.

From the above, it is evident that there will exist a requirement for a significant number of charging stations to be available, as well as the requirement that each charging station should be capable of transferring electrical energy to the battery of the car as quickly as possible. Drivers of electric vehicles may be quite content to wait for 10 or 20 minutes for delivery of a significant amount of electrical energy (say, 20 kWh to 50 kWh); but they will not be willing to wait a number of hours for their electric vehicle to be recharged.

However, there is also increasing awareness of the fact that, by transmitting charging energy using high frequency alternating current, it is possible to reduce the size of the energy transfer components, and the size of wiring, and to take advantage of components and technology that are well advanced in respect of alternating current energy transfer. Still further, by arranging delivery of battery charging energy through a primary side of an inductive coupled transformer mounted at the interface between the charging station and the electric vehicle, it is possible to utilize high voltage, low current energy on the primary side with lower voltage, higher current energy on the secondary side of the inductive coupled transformer or inductive coupler. To accommodate these arrangements, however, there must be a slot or other receptacle on the vehicle, in which the secondary side of the transformer is to be found, while the primary side of the transformer will be found on a probe or plug which is inserted into the slot or receptacle of the vehicle so as to conclude the inductive coupling arrangement.

One particular advantage of such an arrangement is that the voltage and frequency conditions on the primary or charging station side of the inductive coupling interface may be set to be constant for all charging stations, no matter what may be the current acceptance characteristics and terminal voltage of the traction battery that is mounted in the vehicle. Thus, the voltage and current requirements for any specific traction battery in a vehicle are automatically accommodated by the specific design of the secondary side of the transformer which is mounted in the vehicle. Therefore, the vehicle or secondary side of the inductive coupler is thus battery and vehicle specific, for each vehicle and the traction battery mounted therein.

This, in turn, assures that the owner/operator of the vehicle may have full expectation of being able to recharge his traction battery, no matter at which charging station he is located; provided, of course, that there is a standardized physical requirement for the vehicle mounted receptacle and for the charging station energy transfer plug which form the secondary and primary sides, respectively, of the inductive coupled transformer.

The present invention demonstrates the awareness that there must be safe and efficient recharging in very short time periods; and, of course, in order for a charging station to deliver 20 to 50 kWh to an electric vehicle battery in 10 or 20 minutes, then the station must have high power ratings in the order of 100 to 300 kW. Such charging stations or battery chargers are not likely to be widely distributed so as to be found in everyone's garage. Moreover, such high power connections to the locally available power distribution grid are likely to be approved and located in more widely spaced distributions, perhaps not significantly different than the manner in which gasoline refuelling service stations are presently distributed, or even into strategic locations such as downtown public parking lots, and the like.

This, however, gives rise to yet another problem which is manifest with respect to electric vehicles, and will continue to be so. That is that electric vehicles such as automobiles and delivery vans, and the like, may have vastly different battery capacities, battery voltages, and perhaps even battery types.

Thus, as noted above, the present invention will overcome such difficulties by providing a universal charging station which has the capability of charging a large variety of electric automobiles and electric vehicles over a wide range of parameters—including, especially, initial charging current and initial voltage conditions under which the charging operation will take place.

Moreover, as noted above, it is self-evident that there must be an appropriate and compatible power connector or receptacle in order for the vehicle to be connected to a charging station in keeping with the present invention. Thus, the power connector by which an electric vehicle is connected to a charging station must, therefore, have at least two wires that are capable of carrying the maximum value of charging current to be delivered, at the delivery voltage. Moreover, as will be discussed in greater detail hereafter, there must also be communication means that are capable of transferring data concerning the state of charge of the battery being charged between the battery and the charging station.

It is, of course, taken for granted that any battery to be charged must be capable of accepting an initial charging current at a rate greater than 1 C—that is, at a rate in amperes that is greater than the capacity in ampere-hours of the battery.

It is anticipated that, in the future, most electric vehicles will be equipped with a Battery Energy Management System (BEMS). Such a system may be programmed so as to utilize charging algorithms which have been developed and are now becoming available to the market in association with the trade mark MINIT-CHARGER of Norvik Technologies Inc., the Assignee herein. Of course, other algorithms, or other battery charge controllers can be utilized, as discussed hereafter.

The present invention provides for a universal charging station which is capable of charging a great variety of electric vehicles, whether or not they have on board a sophisticated Battery Energy Management System controller, or other controllers, or even if they have no on board controller at all. Accordingly, a universal station in keeping with the present invention will, itself, be equipped with a power section—whose sole function is to deliver charging energy to the battery—and a charge control module whose purposes are described hereafter. The modes in which the universal charging station of the present invention may operate are, in descending order of their sophistication, as follows:

First, the charging station may function as a controlled current source under the control of a battery specific charging control module that is on board the electric vehicle. In that case, the controller section of the charging station acts as a slave to the on board battery specific charging control module in the electric vehicle, in a classical master-slave configuration.

Next, the charging station of the present invention may function substantially in keeping with MINIT-CHARGER technology, whereby the parameter of maximum initial charging current may be more or less automatically established by polling the electric vehicle to determine if there is on board a module which at least identifies the maximum charging current to which the battery should be initially subjected.

Finally, in a lesser degree of sophistication, the universal charging station of the present invention may operate in a mode by which the parameter of maximum initial charging current has been entered either manually or through a data interface by insertion of a card on which such data may be encoded.

Of course, these criteria are determined and discussed on the basis of energy transfer using an inductive coupled transformer. Thus, maximum initial charging current, or control of the charging current, are predicated on the characteristics of the transformer—and especially the secondary side thereof, since the primary side of the transformer is consistent at all charging stations—direct current charging energy that is delivered to the traction battery being charged is generally a high current, low voltage energy; notwithstanding that low current, high voltage energy has been delivered to the primary side of the inductive coupled transformer. Typically, the secondary side of the inductive coupled transformer is arranged to deliver nominal charging voltage in the range of 72 to 324 volts, as determined by the specifications of the battery to be charged. The primary side voltage will be in the range of 800 volts, but industry standards may eventually be settled in the range of less than 600 volts and perhaps as much as 1,200 volts, or more. In any event, current control is effected by controlling the value of current on the delivery or primary side.

In the first instance, the on board battery specific charging control module which is present in the electric vehicle makes the decisions, and sends signals to the charging station as to the magnitude and the timing of the charging current. In the latter two instances, control of the charging function is exercised by the charge control module located in the charging station.

There is, therefore, the provision made by the present invention that charging stations in keeping with the guidelines established hereby will offer enhanced "user friendliness" through its features. Those features may, for example, include a credit or debit card interface, whereby a retail customer may simply and easily pay for the energy delivered to his electric vehicle battery. The charging station may include registers whereby the initial charging current may be manually entered; or it may include a data interface whereby a card that is encoded with the charging parameters settings required for the specific battery carried in the electric vehicle may be inserted into the data interface to ensure that no mistakes or operator errors occur. That card may have the nominal charging voltage and maximum charging current data encoded into it such as by a magnetic stripe, or by such means as a memory chip, or by punched holes, or by embossed depressions and/or mounds, with the assumption that the data interface is compatible with any such card.

Still further, a charging station of the present invention might well be equipped with a meter which might define in advance the amount of energy to be delivered to the battery, or the monetary price of the energy to be delivered to the battery, together with appropriate shut off means to terminate the delivery of charging current when a predetermined amount of energy has been delivered or a predetermined monetary price of the energy has been delivered, whichever occurs first. Even further, the unit monetary price of the energy could be varied by controllers within the charging station, whereby the unit price for energy to be delivered from it may be dependent upon the time of day—it generally being understood that delivery of charging energy during ordinary daytime hours when demand for delivery of electrical energy from the local power authority is quite high, would mean that the unit price for the energy might be higher than in the evening when many offices, stores, and factories, etc., have shut down for the day. Indeed, as discussed hereafter, the local power authority may require a utility interface to be placed in the charging station, whereby it may communicate therewith over its own power lines to set and reset the unit valley price.

There may also be other load management and other functions such as facilities to bill the cost for charging energy delivered to an electric vehicle to the vehicle operator's office, interlock provisions to prevent theft of charging energy except with appropriate authorization to operate the charging station, and so on.

Thus, when the concept of the charging station is extended to a service station, there may be a number of similar charging stations or "charge dispensers" that are physically separated one from the other so that a plurality of electric vehicles can be accommodated. As discussed hereafter, a plurality of electric vehicles might be placed before a plurality of charging stations, all of which are conveniently connected to and fed by a single station rectifier. In any event, depending on the conditions, the multiple charging stations may be operated sequentially so as to charge one electric vehicle at a time, or several may be operated simultaneously provided that the amount of charging energy delivered at any one time does not exceed a predetermined maximum. In either event, priorities or other function controls may be imposed to ensure efficient utilization of the multiple charging stations connected to a common rectifier source. Of course, it also follows that local energy storage devices such as a flywheel unit or stand-by batteries might be provided for load levelling and so as to limit the peak power being drawn from the distribution power grid supplied by the local power authority.

It will also be understood that the operating functions of charging stations generally in keeping with the present invention will depend, at least in part, on the ability of the power section in the charging stations to turn on and turn off very quickly. Moreover, there may be provided a monitoring system which monitors the data communication link between the electric battery being charged and the power station, and the charge control modules may be established in such a manner that they continuously monitor and exchange signals periodically—say, every 0.5 to 2 seconds. The monitoring system would determine if there has been no communication of data over the communication link for a predetermined period of time—say, 4 to 6 seconds—and if so, signals would be initiated to shut down the charging operation so as to avoid serious implications of over-charge to the battery.

It is understood, of course, that the provision of charging energy to the primary side of the inductive coupler, at a frequency of from 10 kHz up to 200 kHz, would require that the charging station be equipped with an appropriately designed and dimensioned switching inverter module which is arranged to delivery energy at the selected primary voltage, and at the selected frequency. Each vehicle would, in turn, be equipped with the appropriately designed and dimensioned inductive coupler and a rectifier so as to deliver charging energy at the voltage level and charging current rates as are determined to be appropriate for the respective traction battery mounted in the vehicle.

DESCRIPTION OF THE PRIOR ART

For a greater understanding of the present invention, and for greater discussion of underlying technologies and/or related circumstances as those to which the present invention applies, Applicant refers to the following patents:

First, a basic teaching of fast charging battery chargers is found in NOR U.S. Pat. No. 5,179,335, issued Jan. 12, 1993. That patent teaches battery chargers where the electric charging power delivered to the battery is periodically interrupted for a preselected timed interval so as to permit the detection of the internal resistance free voltage of the battery during the interruption of the charging power. Circuitry is provided for comparing the internal resistance free voltage with a preselected reference voltage; and additional circuitry is provided to reduce the power being delivered to the battery when the internal resistance free voltage of the battery exceeds the preselected reference voltage. Thus, the rate of charging the battery is gradually reduced.

NOR U.S. Pat. No. 5,202,617, issued Apr. 13, 1993, teaches a fundamental charging station for electric vehicles. There, the electric vehicle battery may be charged either under control of a on board controller, or the charging operation may be manually controlled. The patent requires a power connector and associated power cable for connecting to the vehicle, an interface with signal cables to carry status and/or control signals between the vehicle and the power controller within the charging station, and a lockout which precludes delivery of power to the vehicle except when the power connector is in place. When the charging operation is under the control of an on board controller, the operation of the charging station is battery specific, and thus the operating parameters of the charging station may vary from one electric vehicle to another.

NOR et al were issued U.S. Pat. No. 5,204,611 on Apr. 20, 1993, for a more advanced battery charger. There, the resistance free terminal voltage of the battery is detected during an interval when the charging current is interrupted and compared against an independent reference voltage; but the reference voltage may be altered at any instant in time as a function of the ambient temperature, or the internal temperature or pressure of the battery, or as a function of the charging current when it is within a predetermined range, or even if a particular change in the value of charging current occurs over a predetermined period of time. These various provisions preclude, for example, thermal runaway, and they assure very rapid and complete charging operations for the battery no matter what its condition may have been when it was first connected to the battery charger, provided that it is capable of accepting charge in the first instance.

There is also NOR U.S. Pat. No. 5,206,578, issued Apr. 27, 1993, teaches a monitoring system for batteries during charge or discharge whereby terminals are placed between adjacent pairs of modules and at the end of each battery so that voltage across each module may be measured at the pair of terminals that defines that module. Some or all of the modules may be tested periodically, such as by appropriate operation of a multiplexer. Alarms may be triggered in the event that module voltages are outside of predetermined limits. The testing may, in fact, continue no matter whether the battery is being charged or discharged.

NOR et al U.S. patent application Ser. No. 08/275,878 was filed Jul. 6, 1994, and teaches a universal charging station and method for charging electric vehicle batteries. That application teaches a method and apparatus which delivers direct current charging energy to one or a plurality of vehicles, depending upon operating conditions, where the initial level of charging current and the initial charging voltage are set and determined in keeping with parameters dictated either by an on board battery charging controller, or a charge controller in the charging station, or by manual or automatic setting of those parameters. However, as noted, that charging station is strictly a direct current operating device.

A further U.S. patent application is NOR Ser. No. 08/372, 936 filed Jan. 17, 1995. That application teaches battery energy monitoring circuits whereby a long chain battery may be monitored during both charge and discharge conditions. The monitoring modules for specific cells or battery modules may be isolated one from another and from the battery modules, and arrangements are made to ensure that important voltage and/or current samplings that are taken during periodic interruption or other sampling periods will be such that they are indicative of equilibrium of the electrical charge or discharge reaction at that instant in time. Provisions are made so that erroneous readings taken during fast acceleration or braking of an electric vehicle, or in other circumstances except essentially steady state conditions, may be discarded or disregarded. Other provisions are made whereby warnings are given as to the available energy still within the battery when it depletes below a specified level; and still further means are provided to ensure that the rate of discharge or regenerative charging of the battery do not exceed predetermined limits as may be dictated by the charge acceptance characteristics of the traction battery.

Several patents and publications are known, whereby the details of design and function of the specific plug and receptacle which comprise the inductive coupled transformer which may be utilized by the present invention, are known. They include U.S. Pat. No. 4,656,412, issued Apr. 7, 1987 to McLYMAN. That patent teaches a ferroresonant flux coupled battery charger having, however, a voltage regulating circuit which provides an output voltage, which is proportional to the frequency of the input AC voltage. The ferroresonant circuit includes an output, a saturable core transformer, and a first linear inductor and capacitor which is tuned to resonate at the third harmonic of the AC voltage from the high frequency convertor. A feedback circuit is provided, which compares the voltage across the output terminals with a reference voltage and thereby controls the frequency of the AC voltage so as to maintain the voltage across the output terminals at a predetermined value. There is no discussion as to control of charging current as a function of charge acceptance of the battery being charged.

KLONTZ et al U.S. Pat. No. 5,157,319, issued Oct. 20, 1992, provides a contactless battery charging system which includes a primary converter for converting power from a power source into a high frequency power. A secondary converter is on board an electric vehicle, and is coupled to the battery for converting the high frequency power into charging power supplied to the battery or energy storage device. That charging system operates in the range of from 2 kHz to 50 kHz, and may deliver significant quantities of electrical energy. The invention is, however, more particularly directed to the specific structure of the inductive coupling device. No thought is given as to the manner in which charging current control will be carried out.

Yet another inductive coupling device is that which is taught in CAROSA U.S. Pat. No. 5,216,402 which issued Jun. 1, 1993. There, the inductive coupler is such that when the primary and secondary coils are mated, an extremely low leakage inductance transformer is formed. That transformer permits electric power transfer without metal-to-metal contact, and thereby allows easy removal of the primary or secondary coil away from the transformer. The transformer is said to operate in a frequency domain of about 40 kHz with a power transfer of approximately 6,000 watts being transferred through an inductive coupler having a volume of about 25.8 cubic inches, thereby yielding a power density of 230 watts per cubic inch. The inductive coupler provides a weatherproof device to couple power to a load, such as an electric vehicle, so as to recharge its propulsion battery. No thought is given, however, as to the manner of control of the charging current.

KLONTZ et al have also published a paper entitled *An Actively Cooled 120 KW Co-Axial Winding Transformer For Fast Charging Electric Vehicles*, published at pages 1049 through 1054 of IEEE publication No. 0-7803-1993-1/94. The purpose of this paper is to teach yet another transformer structure operating at 15 kHz to 200 kHz, and providing a highly efficient transformer having a power density in the range of 25 kW/kg. The structure is a co-axial winding transformer. Once again, no thought is given as to the manner in which charging current control will be carried out.

SUMMARY OF THE INVENTION

In accordance with one aspect of the present invention, there is provided both a method of charging the battery of an electric vehicle and an apparatus therefor, where the battery is capable of accepting initial charging current at a rate greater than 1 C, and where the charging station from which the charging energy is delivered to the battery is arranged to deliver charging energy at a predetermined voltage and at a delivery frequency which is typically in the range of from 10 kHz up to 200 kHz. The charging energy is transferred to the vehicle through an inductive coupler, having a primary side connected to the charging station and a secondary side mounted within the vehicle, and thence through a rectifier mounted in the vehicle to the traction battery.

The method comprises the steps of:

(a) Providing the vehicle with the secondary side of an inductive coupler, whereby charging energy is delivered to the vehicle, and thence through the rectifier to the traction battery, as direct current and at a charging voltage which is determined by the transformation characteristic of the secondary side of the inductive coupler. The level of charging current is based on the predetermined voltage and delivery frequency of charging energy delivered to the primary side of the inductive coupler, so as to render the charging voltage to be suitable for the battery being charged.

(b) The primary and secondary sides of the inductive coupler are physically placed into spatial relationship, so as to establish inductive coupling therebetween.

(c) Communication means are established, and are capable of transferring data concerning the state of charge of the battery being charged between the battery and the charging station.

(d) The vehicle is interrogated over the communication means to determine if there is present and associated with the battery in the vehicle a battery specific charging control module; or if there exists in the vehicle a personality module which identifies at least the criterion of maximum charging current under which the battery may be charged at the predetermined charging voltage in the shortest possible time period; or in the absence of a charging module associated with the battery or a module which identifies at least the criterion of maximum charging current under which the battery may be charged at the predetermined charging voltage in the shortest possible time period, to determine if there exists in the vehicle at least a monitoring means to measure the value of terminal voltage of the battery being charged.

The method further comprises one of the steps of:

(e) In the event that a battery specific charging control module is present in the vehicle, charging the battery by delivering charging current through the inductive coupler and rectifier, under the control of the battery specific charging control module. Delivery of charging current to the battery is stopped in keeping with a signal to do so issued by the battery specific charging control module; and subsequently the primary and secondary sides of the inductive coupler are physically displaced from each other so as to disconnect the battery from the charging station.

(f) Alternatively, in the event that a personality module which at least identifies the maximum charging current is present in the vehicle, the battery is charged by delivering charging current through the inductive coupler rectifier initially at the maximum charging current. Periodically, the delivery of charging current is halted, and the instantaneous resistance free terminal voltage of the battery during each interval of time when delivery of charging current has been halted is then determined and compared to a reference voltage stored in a charge control module which is present in the charging station. The charging current is reduced by reducing the current of the charging energy being delivered to the primary side of the inductive coupler, under the control of the charge control module present in the charging station. The delivery of charging current through the inductive coupler and rectifier to the battery is stopped in keeping with a signal issued by the charge control module present in the charging station. Subsequently, the primary and secondary sides of the inductive coupler are physically displaced from each other so as to disconnect the battery from the charging station.

(g) A further alternative is that, in the event that there at least exists in the vehicle a monitoring means to measure the value of the terminal voltage of the battery being charged, the charge station is preset to a predetermined allowable value of current of the charging energy at the predetermined voltage. As well, a maximum amount of charging energy to be permitted to be delivered to the battery, may be preset. Periodically, the delivery of charging current is halted, and the instantaneous resistance free terminal voltage of the battery during each interval of time when delivery of the charging current has been halted is determined and compared to a reference voltage stored in a charge control module which is present in the charging station. The charging current is reduced by reducing the current of the charging energy being delivered to the primary side of the inductive coupler, under the control of the charge control module present in the charging station. Delivery of charging current through the inductive coupler and rectifier to the battery is stopped in keeping with a signal issued by the charge control module present in the charging station, or when the preset maximum amount of charging energy has been delivered to the battery. Subsequently, the primary and secondary sides of the inductive coupler are physically displaced from each other so as to disconnect the battery from the charging station.

In step (e), signals to control the delivery of charging current from the charging station are delivered over the communication means. In each of steps (f) and (g), the data which are indicative of the instantaneous terminal voltage of the battery, are transferred between the battery and the charging station over the communication means.

The secondary side of the inductive coupler may be mounted so as to present a standardized receptacle in the vehicle, into which the primary side of the inductive coupler may be inserted so as to form a separable core transformer.

Moreover, the separable core transformer has a high turns ratio, whereby the primary voltage is high and the primary current is low when compared with the charging voltage and current being delivered to the battery through the rectifier mounted in the vehicle.

BRIEF DESCRIPTION OF THE DRAWINGS

Embodiments of this invention will now be described by way of example in association with the accompanying drawings in which:

FIG. 5(a) is a schematic diagram showing the primary and secondary sides of the inductive coupler in physical and electrical proximity to each other so as to establish inductive coupling, with the output connected to a full wave rectifier; and FIG. 5(b) is a similar Figure as to that shown in FIG. 5(a), but showing the use of bridge connected rectifier.

DETAILED DESCRIPTION OF THE PREFERRED EMBODIMENTS

Reference will now be made to FIGS. 1 through 5.

Figure 1:
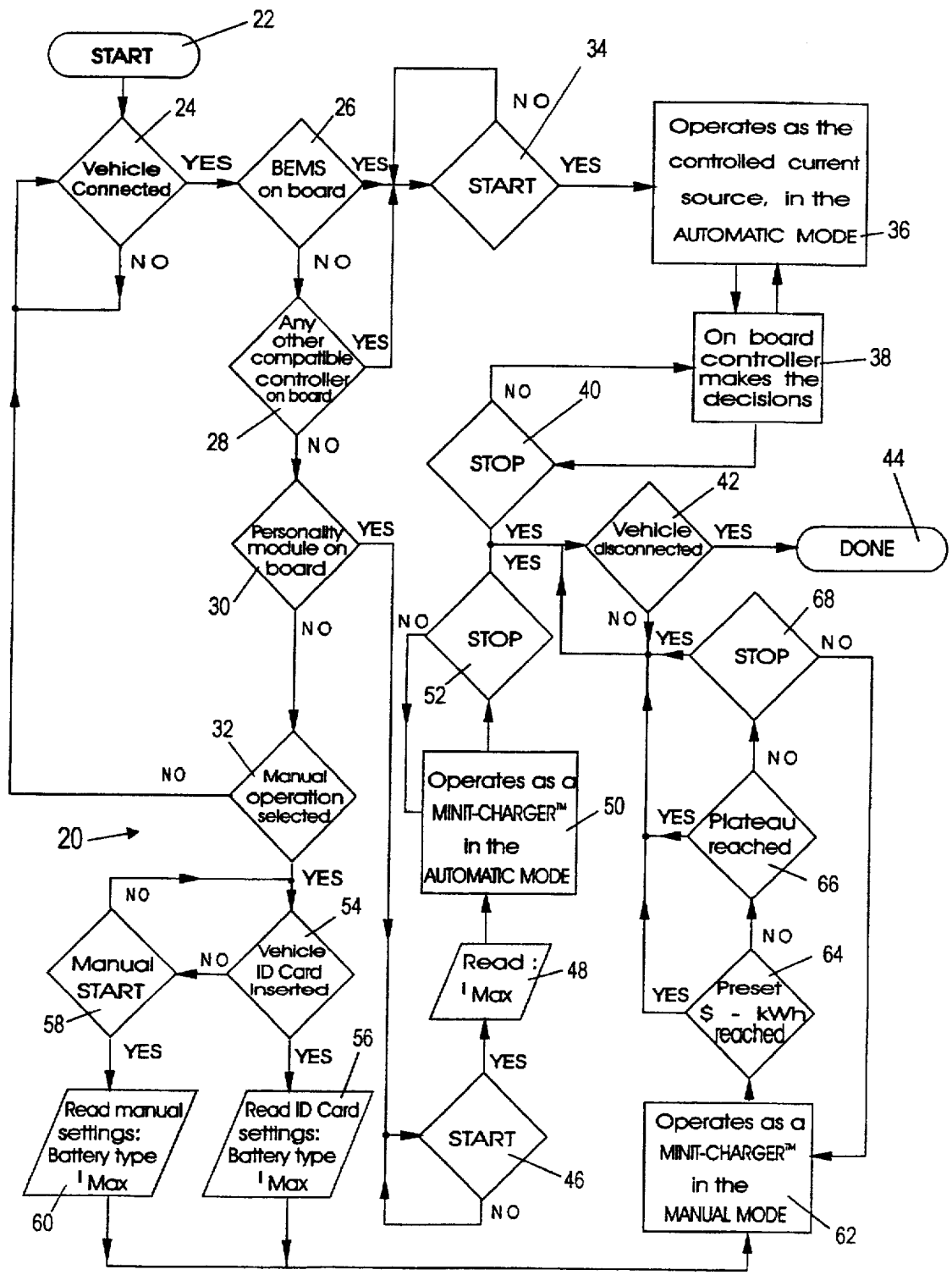
FIG. 1 is a logic flow chart showing the interrogation and various charging schemes which might be carried out in charging an electric vehicle from a universal charging station in keeping with the present invention.

First, having regard to FIG. 1, a typical logic flow diagram 20 for operation of a charging station in keeping with the present invention is provided. At the start 22, a determination is made at 24 as to whether there is a vehicle connected to the charging station. If yes, the vehicle is interrogated at 26 to determine if there is a Battery Energy Management System on board the vehicle. If no, the vehicle is interrogated at 28 to determine if there is any other compatible battery specific charging control modules on board the vehicle; and if no, the vehicle is interrogated at 30 to determine if there is a "personality module" on board the vehicle whereby the personality module will at least identify the criteria of maximum charging current under which conditions the battery may be charged in the shortest possible time period. In the absence of the personality module, the decision is made at 32 as to whether the charging station will be manually operated. If no, the logic loops back to 24, where a determination is made if there is, indeed, a vehicle connected to the charging station. If manual operation is selected at 32, there must at least be present on board the vehicle a monitoring means which determines the terminal voltage of the battery being charged.

Now, if either step 26 or 28 determines that there is a battery specific charging control module on board the vehicle, then charging operation is started at 34. Operators 36 and 38 indicate that the on board battery specific charging control operates the charging station as a controlled current source, with the on board controller making all of the decisions as to the value of charging current at any instant in time. There are also start and stop commands that are issued repetitively, for example every second, which are part of the monitoring function to determine if the charging operation is proceeding normally, and if the established criteria for charging current at any instant in time are still being followed. Sooner or later, usually when the battery is charged, a decision is made at 40 to stop the charging operation. If so, then the charging station interrogates at 42 to determine if the vehicle has been disconnected and if so, the charging operation is done as at 44.

If the decision is made at 30 that a personality module is on board the vehicle, then a start decision is made at 46. The maximum current reading is taken at 48, and control is passed to the charging station at 50. There, the charging station follows charging procedures and methods particularly as discussed in U.S. Pat. No. 5,202,617 and U.S. Pat. No. 5,204,611, mentioned above.

As before, stop commands are periodically issued, for example every second, and sooner or later the decision is made at 52 to stop the charging operation because the battery is fully charged. Once again, the charging station interrogates itself at 42 to determine if the vehicle has been disconnected, and if so the charging operation is done at 44.

Finally, if manual operation has been selected at 32, then a determination is made at 54 as to whether or not a vehicle identification card has been inserted into a data interface in the charging station. That vehicle identification card will establish the charging station settings for maximum charging current; and if it is present, that step is taken at 56.

If no vehicle identification card has been inserted into the data interface on the charging station, then a manual start decision must be made at 58. If so, then the maximum charging current must be manually entered into the register on the charging station at 60.

As noted above, the charging station may be equipped with a meter which might define in advance the amount of energy to be delivered to the battery or the monetary price of the energy to be delivered to the battery, together with appropriate shut off means to terminate the delivery of charging current when a predetermined mount of energy has been delivered or a predetermine monetary price of energy has been delivered, whichever occurs first. Thus, the maximum value of charging energy to be delivered to the battery is accomplished by selectively setting the meter. Still further, as noted above, the unit monetary price of energy may be altered depending on the time of day when charging current flows to the battery.

After either step 56 or 60, the charge control module in the charging station takes over at 62. Once again, a number of decision steps must be followed; the first of those is at 64 where a determination has been made as to whether or not preset values of total kWh to be delivered to the battery have been reached, or if a predetermined price of energy has been reached. If yes, then immediately the charging function is terminated, and the charging station interrogates itself at 42 to determine if the vehicle has been disconnected. If the preset price or amount of energy to be delivered to the battery has not yet been reached, a decision is made at 66 as to whether any particular plateau—which typically would be whether the battery has achieved a specific terminal voltage—has been reached. If so, then once again the charging function is terminated, and the charging station interrogates itself as to whether or not the vehicle has been disconnected at 42. Finally, if neither inquiry at 64 or 66 has terminated the charging operation, then in the meantime and as before there have been periodic stop commands issued by the charge control module within the charging station. Sooner or later, that stop command will be accepted, and the decision will be made at 68 to terminate the charging function. From the above, it is seen that steps 40, 52, and 68 are also indicative of manual intervention in each case, whereby a manual stop command is given.

Of course, decisions to terminate the charging function may be made at 40, 52, 66, or 68, depending on the sophistication of the on board battery charging control module, or the charge control module in the charging station, and depending on the amount of data being communicated across the data communications line, whereby the charging function might be terminated in the event that the internal temperature of the battery, or its internal pressure, become too high, or in keeping with other criteria more particularly as described in U.S. Pat. No. 5,204,611, introduced above.

Figure 2:
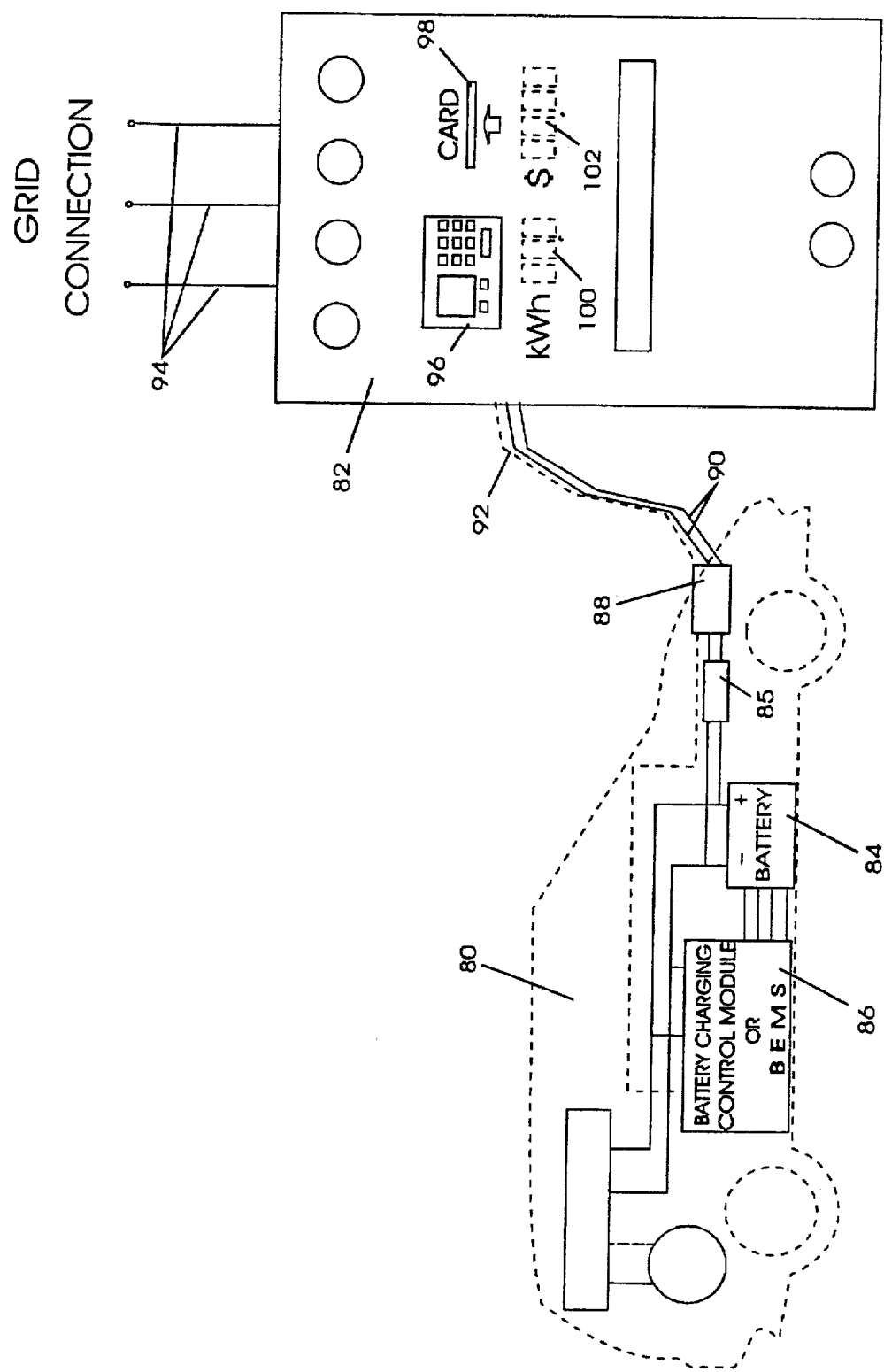
FIG. 2 is a representation of a single charging station and a single vehicle in a typical operating situation, where the battery of the vehicle is being charged by the charging station.

Turning now to FIG. 2, a vehicle 80 is shown being attached to a charging station 82. The vehicle has a battery 84 on board, and may have a battery charging control module or Battery Energy Management System 86, or other monitoring device or module, as described above. The vehicle 80 is connected through the inductive coupler 88 to the charging station 82. There is interposed between the inductive coupler 88 and the battery 84 a rectifier 85, which may be a full wave or bridge type rectifier as discussed hereafter.

There is a pair of wires or a co-axial 90 provided, which is capable of carrying the high voltage, high frequency charging energy to be delivered to the inductive coupler 88, through rectifier 85, and thence to the battery 84. There is also a data communication means 92 that is provided, and it may be dedicated data wires, or it may be a power line carrier device, or optical fibre. Opto-couplers and associated data transfer means may be provided, or low power inductive couplers with their associated transfer means. Alternatively, the data communication line may be a radio frequency transmitter and receiver located appropriately in each of the vehicle 80 and the power station 82. Appropriate wire, cable, optical couplers, or fibre connectors or transfer means will be provided, for the radio frequency transmitter and receiver as necessary.

The power station 82 is shown being connected to the grid connection at wires 94, which is the high voltage AC power lines provided by the local power authority, and from which electrical energy is drawn. Such arrangement is, however, at the power authority frequency—usually 50 Hz or 60 Hz. The face of the power station may be provided with a manual interface and key pad 96, or a card slot 98 that communicates with a data interface within the power station 82. In either event, there are registers or microprocessors thereby provided and associated with the key pad 96 and the card slot 98 by which the setting of maximum charging current may be established manually, or by inserting a card into card slot 98. As noted above, the card and the data interface associated with card slot 98 will be compatible and may be such as to read "personality data" such as the maximum charging current that may be encoded into the card by a magnetic stripe, punched holes, or embossed depressions and/or mounds. Other annunciators 100 and 102 may be provided to give a running indication of the amount of energy being delivered in kWh or its cost in local currency, such as dollars.

In that regard, it has been noted that it may be appropriate to equip the utility interface on the front face of the charging station 82 with appropriate programmable registers or the like within the charging station to set the price per unit of energy depending on the time day. The time dependent pricing provides benefit for all of the power authority, the operator of the charging station, and the consumer, since higher daytime prices might tend to discourage operation of the charging station during peak energy consumption times during the day. It may be that the price to the operator of the charging station from the local power authority may vary depending on the time of day. In any event, there may be less demand on the power authority and economies to be realized by the consumer, if the charging station is operated at off-peak hours.

It should also be noted that the Battery Energy Management System 86 which is on board the vehicle 80 may also have with it suitable monitoring means to monitor the battery 84 during charge and/or discharge, as taught in U.S. Pat. No. 5,206,578, introduced above.

Moreover, the personality module which might be provided on board the vehicle 80, in place of the charge controller 86, may be designed to provide a calibrated divider network whose purpose is to make the battery 84 appear to the charging station 82 as if it is a standard lead/acid battery of known nominal voltage. Of course, at the same time, maximum charging current is established by the personality module. Thus, various electrochemical systems for the battery 84 may be accommodated.

Figure 3:
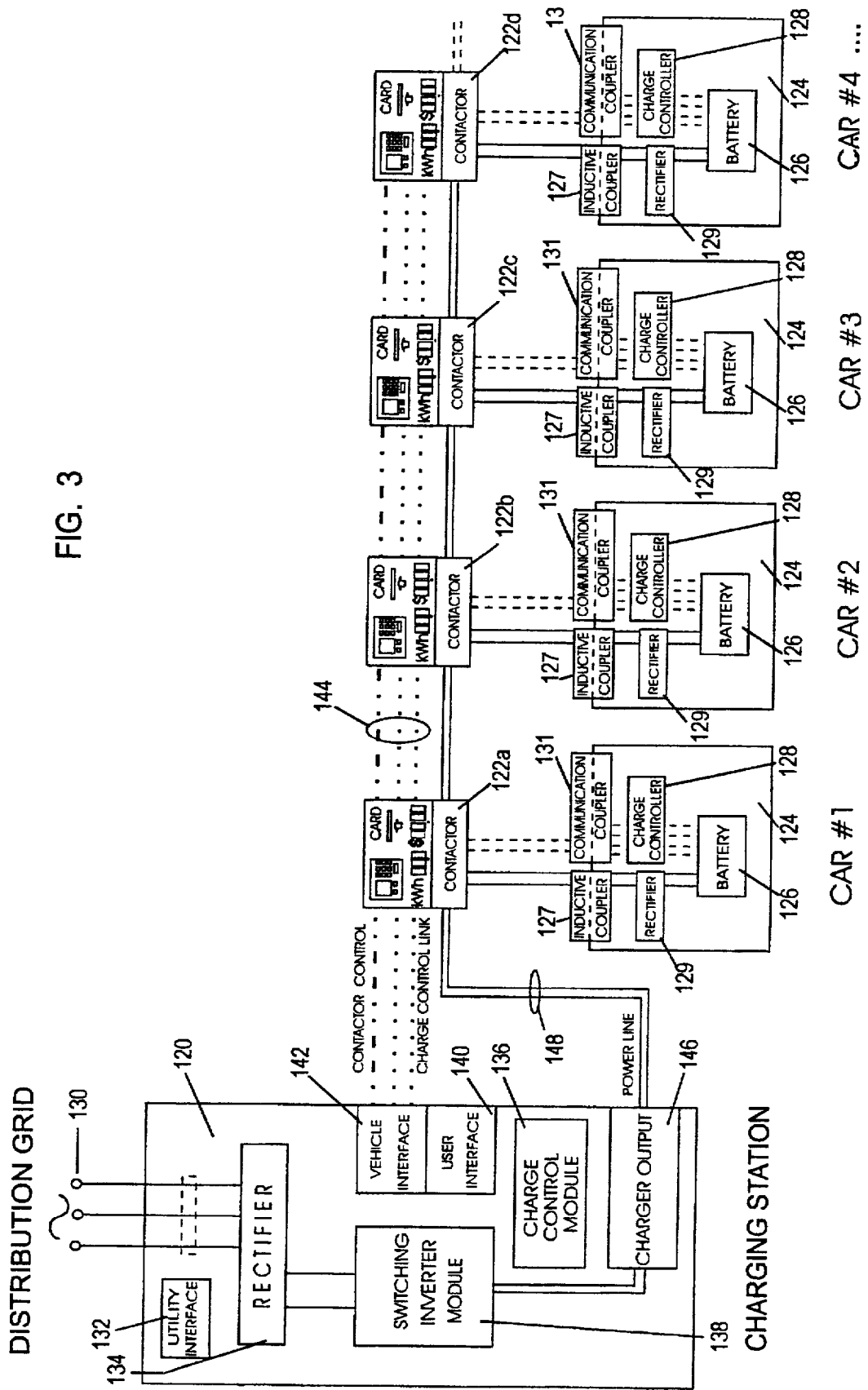
FIG. 3 is a typical general schematic of a multi-vehicle fleet charging station in keeping with the present invention.

Now, turning to FIG. 3, a typical system is shown as might be operated by a fleet operator who owns a number of electric vehicles which might be delivery vehicles, fork lift trucks, golf carts, rental vehicles, or the like. There, a plurality of vehicle batteries may be charged from the single charging station 120, by distributing charging energy to any one of a plurality of switches or contactors 122, to which a plurality of electric vehicles 124 may be connected. Each vehicle 124 has its own on board battery 126, and its own on board charge controller, or battery charging control module 128, in the present discussion. Moreover, each vehicle 124 will be equipped with its own inductive coupler 127, and its own rectifier 129. Also, a communication coupler 131 is provided, whereby data which are unique to each vehicle 124 may be transferred to the charging station 120.

The charging station 120 is connected to the distribution grid at 130, through rectifier 134. The utility interface 132 provides means for the local power authority to communicate with the charging authority to communicate with the charging station, for such purposes as to change the monetary unit price, as discussed above. Within the charging station 120 there is a charge control module 136, a switching inverter module 138, a user interface 140, and a vehicle interface 142. The user interface may be the same as key pad 96, for example, shown in FIG. 2 and/or card slot 98. The vehicle interface 142 provides means by which a data communication link 144 communicates with the charging station 120 from each communication coupler 131. The charger output from the charging station is at 146, and a power line comprising a pair of wires or a co-axial cable 148 provides the charging current to each of the contactors 122.

Here, only one of the contactors 122 will be selectively closed at any one time. However, each of the contactors 122 has its own unique designation—for example, as indicated by the designations 122a, 122b, 122c, 122d, etc. Thus, means are provided to selectively close any one of the contactors while retaining the power line 148 in connection with all of the switches or contactors.

It must be noted that the switching inverter module varies significantly from the switching inverter module which is discussed in Applicant's copending application Ser. No. 08/275,878, referenced above. In that prior application, it is clear that the purpose of the switching inverter module is to provide current control so as to control the rate of delivery of charging energy. As well, the switching inverter in the prior invention may be utilized so as to isolate the direct current power output from the charging station which receives its input power over the power lines from the distribution grid. Thus, more pure and controlled direct current power can be provided; and there is also thus provided galvanic isolation of any vehicle which may be connected to the power charging station from the distribution grid. In the present invention, however, the purpose of the switching inverter module is to provide high voltage alternating current in the frequency range of from 10 kHz up to 200 kHz. Conveniently, it has been found that a suitable operating frequency for most purposes is around 60 kHz. Thus, the output from the charger output 146 is high voltage, low current, high frequency charging energy.

It is clear, of course, that the charging station 82 of FIG. 2 is similarly provided with a high frequency switching inverter module, as described above with respect to the charging station 120.

The decision as to the order of sequentially closing one at a time of the switches or contactors 122a, 122b, etc., may be established according to any one of a number of priority protocols. For example, it may well be that the operator or owner of the charging station and all of the vehicles connected to it might choose to establish no priority, and will close each of the switches or contactors 122a, 122b, etc., in sequence, accordingly to their respective unique designation. On the other hand, he may establish a priority as to which of the respective batteries 126 will be charged first by determining which of those batteries might require either the greatest amount of charging energy or the least amount of charging energy. The other batteries would then be ranked according to their respective charge requirements, either greater or lesser in keeping with the protocol being established. Alternatively, some other user-determined priority protocol may be established.

Figure 4:
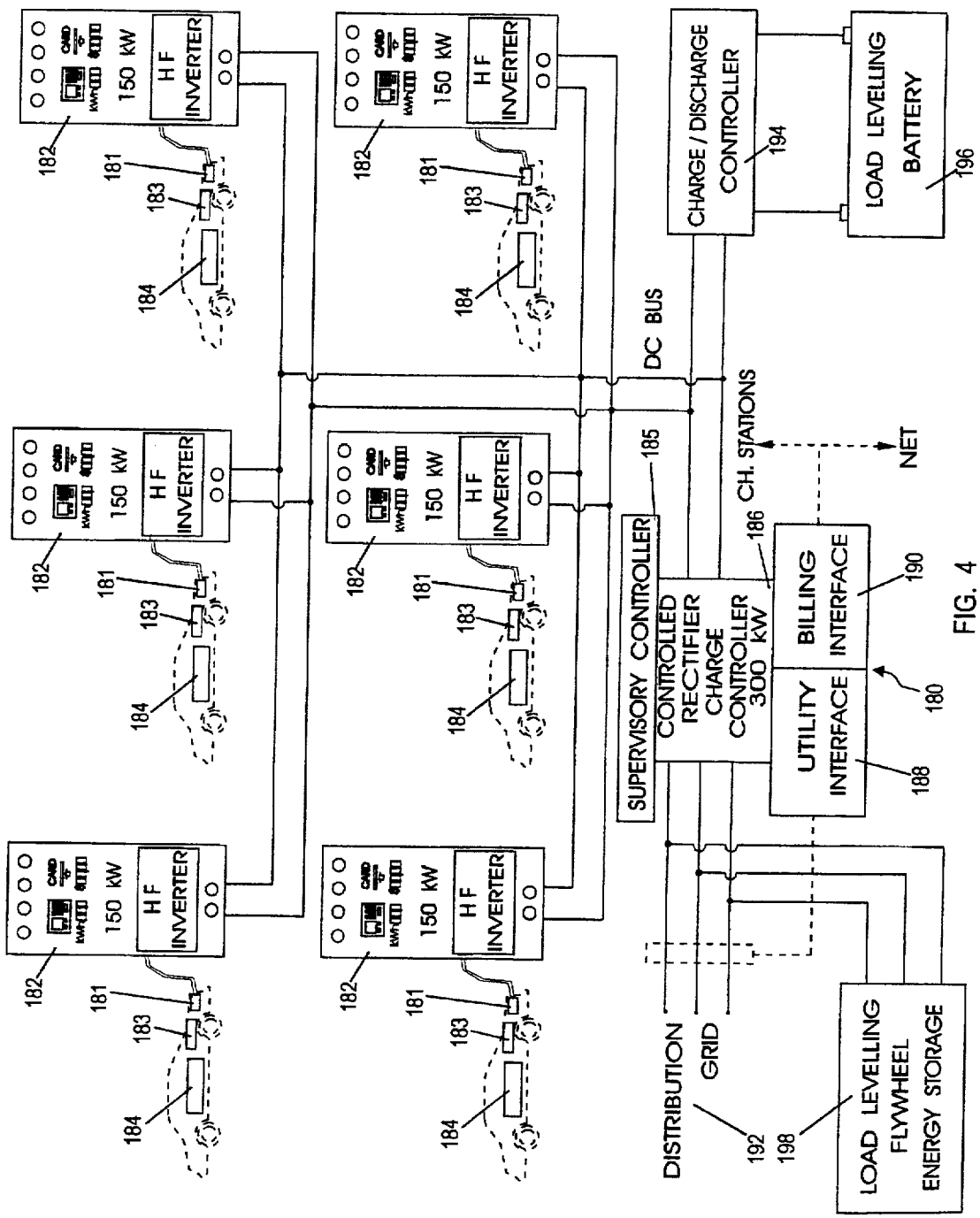
FIG. 4 is a typical general schematic of a multi-vehicle service station in keeping with the present invention.

Turning now to FIG. 4, a typical public service station 180 is shown. Here, there are a plurality of charging stations or outlets 182, to each of which a vehicle 184 may be connected in much the same manner and using the same arrangements as shown in FIG. 2. Each charging station 182 may have essentially the same appearance and operation as charging station 82, described above in association with FIG. 2. Moreover, each vehicle 184 is provided with its own inductive coupler receptacle 181 and rectifier 183, as described above with reference to FIGS. 2 and 3.

Each of the charging stations 182 within service station 180 may have a power rating of 150 kW, for example.

However, the single and common controlled rectifier 186 from which each of the charging stations 182 is supplied charging power may have a rating of 300 kW. It, of course, is provided with its own utility interface 188 and its own billing interface 190. The utility interface provides the appropriate connections to the distribution grid 192 which is provided by the local power authority; the billing interface 190 interfaces for purposes of accounting and management to each of the charging stations 182 and to such as a data network operated by credit card and debit card issuers.

It is possible that more than one vehicle 184 may be connected to more than one charging station 182 at any one time. If so, and if each of the associated electric vehicle batteries is absorbing maximum charging current at one time, the output from the controlled rectifier 186 may exceed its rating. In that case, a supervisory controller 185 may monitor the output of the controlled rectifier, and may be such as to issue signals which either reduce the output from each of the charging stations 182 that may be operating, or which might preclude the possibility of another of the charging stations 182 from coming on line until such time as the output from the controlled rectifier has reduced below the predetermined allowable maximum output.

Likewise, means may be provided for load levelling, whereby the energy demands by the controlled rectifier 186 from the distribution grid 192 may be reduced. For example, a load levelling battery 196 may be provided, or a load levelling flywheel energy storage device 198 may be provided. Their function is to accumulate energy during off-peak hours, when the price of energy from the distribution grid is low, and to support the service station 180 whenever necessary during peak hours. Obviously, the purpose of the charge/discharge controller 194 may also be to ensure that the load levelling battery 196 is recharged during off-peak hours to its maximum capacity.

It has been described above that each inductive coupler by which charging energy may be transferred from the charging station to the vehicle comprises a primary side and a secondary side. Each of FIGS. 5(*a*) and 5(*b*) shows generally the physical and electrical arrangement by which the inductive coupled transformer, or inductive coupler, is established. As noted, the differences between the embodiments of FIG. 5(*a*) and FIG. 5(*b*) are the manner of rectification which is carried out in the vehicle.

An inductive coupler is shown generally at 200, and it comprises a primary winding 210 and a secondary winding 212. It will be noted that there is a high turns ration between the primary and secondary windings 210 and 212. Conveniently, the primary side 211 and the secondary side 213 are physically arranged so that the ferrite member 214 and ferrite member 216 can be juxtaposed in such a manner as to establish magnetic flux, while at the same time the ferrite member 214 is contained within a socket or receptacle 218 defined by the ferrite member 216 and its housing. Thus, the physical assembly of the inductive coupler 200 is not unlike placing a plug into a receptacle.

It follows that the physical design of the receptacle and of the plug can be standardized, and moreover that the primary side 211 of the inductive coupler can be designed so as to be consistent, having the same physical and electrical characteristics for all electrical charging stations. Thus, the electrical characteristics of the secondary side 213 can be specifically designed to accommodate the respective rectifier arrangement 217 or 219 and the associated battery 220 or 222, as shown in FIGS. 5(*a*) and 5(*b*). It may be that the charging voltage, and the current acceptance characteristic of battery 220 might be considerably different than that of battery 222; but it is obvious that even though the primary side of the inductive coupler has predetermined and settled physical and electrical characteristics, the secondary side can be arranged to provide the necessary DC voltage and DC current required to charge battery 220 or battery 222.

There has been described apparatus and methods for charging one or a plurality of electric vehicles, where the charging station to which any electric vehicle may be connected is essentially universal in that it will accommodate a great variety of electric vehicles which may have on board controllers or which may rely on charge controllers within the charging stations. The charging energy delivered by the charging station to the vehicle is at high frequency (in the order of 10 kHz up to 200 kHz), having high voltage and low current. This, in turn, is transformed and rectified to low voltage, high current power, in the vehicle.

Other modifications and alterations may be used in the design and manufacture of the apparatus of the present invention without departing from the spirit and scope of the accompanying claims.

What is claimed is:

1. A method of charging a battery for an electric vehicle, where the battery is capable of accepting initial charging current at a rate greater than 1 C, and where a charging station from which the charging energy is delivered to the battery is arranged to deliver charging energy at a predetermined voltage and at a delivery frequency which is in the range of from 10 kHz up to 200 kHz, where charging energy is transferred to said vehicle through an inductive coupler having a primary side connected to said charging station and a secondary, side mounted within said vehicle, and thence through a rectifier mounted in said vehicle to said battery; said method comprising the steps of:

(a) providing said vehicle with said secondary side of said inductive coupler, whereby charging energy is delivered to said vehicle, and thence through said rectifier to said battery as direct current and at a charging voltage which is determined by the transformation characteristic of said secondary side of said inductive coupler, based on said predetermined voltage and delivery frequency of charging energy delivered by said charging station to said primary side of said inductive coupler, so as to render said charging voltage to be suitable for said battery being charged;

(b) physically placing the primary and secondary sides of said inductive coupler into spatial relationship so as to establish inductive coupling therebetween;

(c) establishing communication means capable of transferring data concerning the state of charge of the battery being charged between the battery and the charging station;

(d) interrogating the vehicle over said communication means to determine if there is present and associated with said battery in said vehicle a battery specific charging control module; or if there exists in said vehicle a personality module which identifies at least the criterion of maximum charging current under which the battery may be charged at said predetermined charging voltage in the shortest possible time period; or in the absence of a battery specific charging module associated with said battery or a personality module which identifies at least the criterion of maximum charging current under which the battery may be charged at said predetermined charging voltage in the shortest possible time period, to determine if there exists in said vehicle at least a monitoring means to measure the value of terminal voltage of the battery being charged;

wherein said method further comprises one of the steps of:

(e) in the event that a battery specific charging control module is present in said vehicle, charging said battery by delivering charging current through said inductive coupler and said rectifier under the control of said battery specific charging control module, stopping the delivery of charging current to said battery in keeping with a signal to do so issued by said battery specific charging control module, and subsequently physically displacing said primary and secondary sides of said inductive coupler so as to disconnect said battery from said charging station; or (f) in the event that a personality module which at least identifies the maximum charging current is present in said vehicle, charging said battery by delivering charging current through said inductive coupler and said rectifier initially at said maximum charging current, periodically halting the delivery of charging current and determining the instantaneous resistance free terminal voltage of said battery during each interval of time when delivery of charging current has been halted and comparing said instantaneous resistance free terminal voltage to a reference voltage stored in a charge control module which is present in said charging station, reducing the charging current by reducing the current of said charging energy being delivered to said primary, side of said inductive coupler under the control of said charge control module present in said charging station, stopping the delivery of charging current through said inductive coupler and said rectifier to said battery in keeping with a signal issued by said charge control module present in said charging station, and subsequently physically displacing said primary and secondary sides of said inductive coupler so as to disconnect said battery from said charging station; or (g) in the event that there at least exists in said vehicle a monitoring means to measure the value of the terminal voltage of the battery being charged, presetting the charge station to a predetermined allowable value of current of said charging energy at said predetermined voltage and presetting a maximum amount of charging energy to be permitted to be delivered to said battery, periodically halting the delivery of charging current and determining the instantaneous resistance free terminal voltage of said battery during each interval of time when delivery of the charging current has been halted and comparing said instantaneous resistance free terminal voltage to a reference voltage stored in a charge control module which is present in said charging station, reducing the charging current by reducing the current of said charging energy being delivered to said primary side of said inductive coupler under the control of said charge control module present in said charging station, stopping the delivery of charging current through said inductive coupler and said rectifier to said battery in keeping with a signal issued by said charge control module present in said charging station or when said preset maximum amount of charging energy has been delivered to said battery, and subsequently physically displacing said primary and secondary sides of said inductive coupler so as to disconnect said battery from said charging station;

wherein, in step (e), signals to control the delivery of charging current from said charging station are delivered over said communication means; and in each of steps (f) and (g), the data which are indicative of the instantaneous terminal voltage of said battery, are transferred between said battery and said charging station over said communication means.

2. The method of claim 1, wherein said secondary side of said inductive coupler is mounted so as to present a receptacle having a selected size in said vehicle, into which said primary side of said inductive coupler may be inserted so as to form a separable core transformer.

3. The method of claim 2, wherein said separable core transformer has a high turns ratio, whereby said primary voltage is high and said primary current is low when compared with the charging voltage and current being delivered to said battery through said rectifier.

4. The method of claim 1, wherein said communication means may be chosen from the group consisting of dedicated data wires, power line carrier devices, optical fibres, opto-couplers, and associated data transfer means, inductive couplers and associated transfer means, radio frequency transmitters and receivers.

5. The method of claim 1, wherein the step of presetting the charge station to a predetermined allowable value of current of said charging energy at said predetermined voltage is accomplished either by manually setting that value into a value register therefor, which is located in said charging station, or by inserting data into said value register through a data interface located in said charging station, where said data interface is capable of reading a card which has said allowable value of current encoded into said card by any of a magnetic stripe, punched holes, embossed depressions, and embossed mounds, any of which are compatible with a specific said data interface.

6. The method of claim 1, wherein the step of presetting the maximum amount of charging energy to be delivered to said battery is accomplished by selectively setting a meter to determine the amount of energy delivered to said battery or to determine the monetary value of the energy delivered to said battery, so as to terminate the delivery of charging energy at said predetermined voltage when a predetermined amount of energy has been delivered or a predetermined monetary value of energy has been delivered, whichever occurs first; and wherein the unit monetary price of energy may be altered depending on the time of day when charging energy flows to said battery.

7. The method of claim 1, wherein a plurality of vehicle batteries may be charged from a single charging station, by distributing charging energy to any one of a plurality of switches or contactors each of which has a unique designation, and each of which is connected to a respective primary side of a respective inductive coupler, selectively closing only one of said plurality of switches or contactors at any one time, and charging the connected one of said plurality of vehicle batteries.

8. The method of claim 7, wherein the decision as to the order of sequentially closing one at a time of said switches or contactors is determined by one of (a) establishing no priority and closing said switches or contactors in sequence as to their respective unique designation; or (b) establishing a priority as to whether the respective batteries connected through each respective switch or contactor and respective primary side of its respective inductive coupler shall be charged in order of those batteries requiring either the greatest amount or the least amount of charging energy to be charged first, and thence in ranking charge requirements thereafter; or (c) selectively designating which battery is to be charged first in keeping with a user-determined priority protocol.

9. The method of claim 1, wherein at least the data which is indicative of the instantaneous terminal voltage of said battery are periodically transferred over said communication means, and if no such communication occurs within a predetermined period of time, a signal to stop delivery of charging energy to said inductive coupler is issued and the flow of charging energy to said battery stops.

10. A charging station for charging a battery for an electric vehicle, where the battery is capable of accepting initial charging current at a rate greater than 1 C, where said charging station is arranged to deliver charging energy at a predetermined voltage and at a delivery frequency which is in the range of from 10 kHz up to 200 kHz to a primary side of an inductive coupler, and wherein said battery is mounted in a vehicle having a secondary side for said inductive coupler mounted wherein together with a rectifier connected between said secondary side of said inductive coupler and said battery; whereby said predetermined voltage at which said charging current is delivered to said battery is determined by the transformation characteristic of said secondary side of said inductive coupler, based on said predetermined voltage and delivery frequency delivered to said primary side of said inductive coupler, so as to render said charging voltage to be suitable for said battery being charged; wherein said charging station comprises:

means for delivering energy at said predetermined voltage and said delivery frequency to said primary side of said inductive coupler;

communication means capable of transferring data between said battery and said charging station concerning the state of charge of said battery being charged;

means for interrogating the vehicle over said communication means to determine if there is present and associated with said battery in said vehicle a battery specific charging control module; or to determine if there exists in said vehicle a personality module which identifies at least the criterion of maximum charging current under which the battery may be charged at said predetermined charging voltage in the shortest possible time period; or in the absence of a battery specified charging module associated with said battery or a personality module which identifies at least the criterion of maximum charging current under which the battery may be charged at said predetermined charging voltage in the shortest possible time period, to determine if there exists in said vehicle at least a monitoring means to measure the value of terminal voltage of the battery being charged;

means for charging said battery by delivering charging energy to said inductive coupler and thence through said rectifier to said battery under the control of a battery specific charging control module in said vehicle, in the event that a battery specific charging control module is present in said vehicle, and means for stopping the delivery of charging energy to said inductive coupler in keeping with a signal to do so issued by said battery specific charging control module;

means for charging said battery by delivering charging energy to said inductive coupler and through said rectifier to said battery, initially at a maximum charging current, in the event that a personality module which at least identifies the maximum charging current is present in said vehicle, means for periodically halting the delivery of charging current and determining the instantaneous resistance free terminal voltage of said battery during each interval of time when delivery of charging current has been halted, means for comparing said instantaneous resistance free terminal voltage to a reference voltage stored in a charge control module which is present in said charging station, means for reducing the charging current by reducing the current of said charging energy being delivered to said primary side of said inductive coupler under the control of said charge control module present in said charging station, and means for stopping the delivery of charging current through said inductive coupler and said rectifier to said battery in keeping with a signal issued by said charge control module present in said charging station; and means for presetting the charge station to deliver a predetermined allowable value of current of said charging energy at said predetermined voltage in the event that there at least exists in said vehicle monitoring means to measure the value of the terminal voltage of the battery being charged, means for presetting a maximum mount of charging energy to be pertained to be delivered to said bakery, means for periodically halting the delivery of charging current, means for determining the instantaneous resistance free terminal voltage of said battery during each interval of time when delivery of the charging current has been halted, means for comparing said instantaneous resistance free terminal voltage to a reference voltage stored in a charge control module which is present in said charging station, means for reducing the charging current by reducing the current of said charging energy being delivered to said primary side of said inductive coupler under the control of said charge control module present in said charging station, and means for stopping the delivery of charging current through said inductive coupler and said rectifier to said battery in keeping with a signal issued by said charge control module present in said charging station or when said preset maximum value of charging energy has been delivered to said battery;

wherein signals to control the delivery of charging energy from said charging station under the control of said battery specific charging control module in said vehicle, are delivered over said communication means; and data which are indicative of the instantaneous terminal voltage of said battery, are transferred between said battery and said charge control module in said charging station over said communication means.

11. The apparatus of claim 10, wherein said secondary side of said inductive coupler is mounted so as to present a receptacle having a selected size in said vehicle, into which said primary side of said inductive coupler may be inserted so as to form a separable core transformer.

12. The apparatus of claim 11, wherein said separable core transformer has a high turns ratio, whereby said primary voltage is high and said primary voltage is low when compared with the charging voltage and current being delivered to said battery through said rectifier.

13. The apparatus of claim 10, wherein said communication means is chosen from the group consisting of dedicated data wires, power line carrier devices, optical fibres, optocouplers and associated data transfer means, inductive couplers and associated transfer means, radio frequency transmitters and receivers.

14. The apparatus of claim 10, wherein said means for presetting the charge station to a predetermined allowable value of current of said charging energy at said predetermined voltage comprises means for manually setting that value into a value register in said charging station, and a data interface in said charging station for inserting data into said value registers through said data interface; and wherein said data interface has means which are capable of reading a card which has said allowable value of current encoded thereinto by any of a magnetic stripe, punched holes, embossed depressions, and embossed mounds, any of which are compatible with a specific said data interface.

15. The apparatus of claim 10, wherein said means for presetting the maximum amount of charging energy to be delivered to said battery comprises a meter having means to determine the amount of energy delivered to said battery and to determine the monetary value of the energy delivered to said battery, and means to terminate the delivery of charging energy at said predetermined voltage when a predetermined amount of energy has been delivered or a predetermined monetary price of energy has been delivered, whichever occurs first; and wherein the unit monetary value of energy may be altered depending on the time of day when charging energy flows to said battery.

16. The apparatus of claim 10, comprising means whereby a plurality of vehicle batteries may be charged from a single charging station, means for distributing charging energy to any one of a plurality of switches or contactors, each of which has a unique designation, and each of which is connected to a respective primary side of a respective inductive coupler; said apparatus further comprises means for selectively closing only one of said plurality of switches or contactors at any one time, so as to charge the one of said plurality of vehicle batteries which is connected to said one of said plurality of switches or contactors.

17. The apparatus of claim 16, wherein the order of sequentially closing one at a time of said switches or contactors may be determined by one of (a) means for closing said switches or contactors in sequence as to their respective unique designation; (b) means for establishing a priority as to whether the respective batteries connected through each respective switch or contactor and its respective primary side of its respective inductive coupler shall be charged in order of those batteries requiring either the greatest amount or the least amount of charging energy to be charged first, and thence in ranking charge requirements thereafter; and (c) means for selectively designating which battery is to be charged first in keeping with a user-determined priority protocol.

18. The apparatus of claim 10, further comprising means to periodically transfer at least the data which is indicative of the instantaneous terminal voltage of said battery over said communication means, means for monitoring the transfer of data over said communication means, and means for determining if no such transfer of data over said communication means has occurred within a predetermined period of time, whereby a signal to stop delivery of charging energy to said inductive coupler is issued in the event that said monitoring means detects no transfer of data over said communication means within said predetermined period of time.

* * * * *